United States Patent
Matmour et al.

(10) Patent No.: US 10,752,706 B2
(45) Date of Patent: Aug. 25, 2020

(54) METHOD FOR SYNTHESISING A POLYMER BEARING AT LEAST ONE PHOSPHONATE GROUP, POLYMER OBTAINED BY SAID METHOD AND COMPOSITION CONTAINING SAME

(71) Applicant: COMPAGNIE GENERALE DES ETABLISSEMENTS MICHELIN, Clermont-Ferrand (FR)

(72) Inventors: Rachid Matmour, Clermont-Ferrand (FR); Camille Chatard, Castries (FR); Cédric Loubat, Castries (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 184 days.

(21) Appl. No.: 16/064,224

(22) PCT Filed: Dec. 5, 2016

(86) PCT No.: PCT/FR2016/053210
§ 371 (c)(1),
(2) Date: Jun. 20, 2018

(87) PCT Pub. No.: WO2017/109316
PCT Pub. Date: Jun. 29, 2017

(65) Prior Publication Data
US 2019/0031789 A1 Jan. 31, 2019

(30) Foreign Application Priority Data
Dec. 21, 2015 (FR) ...................... 15 62885

(51) Int. Cl.
| | | |
|---|---|---|
| *C08C 19/24* | (2006.01) | |
| *C08C 19/38* | (2006.01) | |
| *C08L 9/00* | (2006.01) | |
| *B60C 1/00* | (2006.01) | |
| *C08L 19/00* | (2006.01) | |
| *C08K 3/013* | (2018.01) | |
| *C08K 5/00* | (2006.01) | |

(52) U.S. Cl.
CPC ............ *C08C 19/24* (2013.01); *B60C 1/0016* (2013.01); *B60C 1/0025* (2013.01); *C08C 19/38* (2013.01); *C08L 9/00* (2013.01); *C08L 19/006* (2013.01); *C08K 3/013* (2018.01); *C08K 5/0025* (2013.01); *C08L 2312/00* (2013.01)

(58) Field of Classification Search
CPC ......... C08C 19/24; C08C 19/38; C08K 3/013; C08L 9/00; C08L 2312/00
See application file for complete search history.

(56) References Cited

U.S. PATENT DOCUMENTS

| 2017/0022296 A1 | 1/2017 | Dire et al. |
| 2017/0218099 A1 | 8/2017 | Dire et al. |

FOREIGN PATENT DOCUMENTS

| FR | 3017387 A1 | 8/2015 |
| FR | 3017388 A1 | 8/2015 |

OTHER PUBLICATIONS

Essahli et al., Phosphoric Acid Functionalized Polyethyelyeene Glycol and Derivatives, Journal of Applied Polymer Science vol. 108, No. 1 Jan. 2008, pp. 483-490.*
Boutevin et al., European Polymer Journal vol. 33, No. 3 Mar. 1997, pp. 263-271.*
International Search Report (PCT/ISA/210) for PCT/FR2016/053210 dated May 9, 2017.
French Search Report for French Application FR1562885 dated August 9, 2016.
Mohamed Essahli et al: "Phosphonic acid functionalized polyethylene glycol and derivatives," Journal of Applied Polymer Science, vol. 108, No. 1, Jan. 1, 2008 (Jan. 1, 2008), pp. 483-490.
Boutevin B et al: Translated Title: "Functionalization of methyl polymethacrylate by phosphones groups," European Polymer Journal, Pergamon Press Ltd. Oxford, GB, vol. 33, No. 3, Mar. 1, 1997 (Mar. 1, 1997), pp. 263-271.

\* cited by examiner

*Primary Examiner* — Robert D Harlan
(74) *Attorney, Agent, or Firm* — Dickinson Wright PLLC

(57) ABSTRACT

A process for synthesizing a polymer bearing at least one phosphonate group in the polymer chain is provided. The process comprises at least the reaction of a starting polymer bearing at least one nucleophilic function in the polymer chain with at least one electrophilic compound bearing both a phosphonate group and an electrophilic function. The electrophilic function is selected from the halide function, the acyl halide function, the ester function, the carboxylic acid function and the isocyanate function.

19 Claims, No Drawings

US 10,752,706 B2

METHOD FOR SYNTHESISING A POLYMER BEARING AT LEAST ONE PHOSPHONATE GROUP, POLYMER OBTAINED BY SAID METHOD AND COMPOSITION CONTAINING SAME

This application is a 371 national phase entry of PCT/FR2016/053210 filed on 5 Dec. 2016, which claims benefit of French Patent Application No. 1562885, filed 21 Dec. 2015, the entire contents of which are incorporated herein by reference for all purposes.

BACKGROUND

1. Technical Field

The present invention relates to polymers, in particular elastomers, bearing at least one phosphonate group and to the process for preparing same. The present invention also relates to rubber compositions containing such polymers especially with a view to improving the dispersion of the fillers within the polymers.

2. Related Art

In the field of tire manufacturing and in particular of the formulation of rubber compositions in contact with the ground, referred to as treads, there is a continual search for means for improving the dispersion of the fillers within the polymers and thus for improving the properties of reinforcement of the rubber composition containing them. One of the means for achieving this result is the use of coupling agents capable of establishing interactions between the polymer and the filler. Another means for achieving it is to use polymers, the structure of which is modified with the aim of obtaining a good interaction between the polymer thus modified and the filler, whether it is carbon black or another reinforcing inorganic filler.

The structure of the polymers may be modified by introducing a function which is reactive with regard to the filler, at any point in its synthesis by various known means. Thus, the function can be introduced into the structure of the polymer at the time of the initiation of an anionic polymerization, when the polymerization initiator bears this function. The function will be borne at the chain end on conclusion of the synthesis. The function can also be introduced at the chain end of a polymer by reacting a living polymer with a functionalization agent. The function can also be borne by one of the polymerized monomers.

Numerous authors have dealt with these approaches to modification and there is copious literature on these subjects, especially for polymers bearing phosphonate groups.

Indeed, polymers bearing phosphonate groups have recently gained increasing interest due to their utility in a wide range of applications, such as, for example, fuel cells, electrolyte membranes (cation-exchange membranes), flame retardants, coating additives, biomaterials, in particular in orthopaedic applications, the solubilization of medicaments, for example hydrogels for the release of medicaments, promoters of cell proliferation, corrosion-inhibiting agents in cooling systems, and compositions for tires in order to improve interactions between the rubber and the fillers.

Thus, among the modification approaches with a view to obtaining polymers bearing phosphonate groups, mention may be made for example of radical copolymerization of a diene and of vinyl phosphonate (Journal of Polymer Science (1952), 8, pp 255-6; application FR 1403732). However, the authors report difficulties in introducing the phosphonate monomer into the polymer chain.

It is also known to introduce phosphonate groups at the chain end by deactivating living anionic chains by dialkyl chlorophosphate, dialkyl chlorothiophosphate, phosphorus oxyhalide or else phosphorus thiohalide compounds (European Polymer Journal, Volume 17 Issue 4, pp 407-11, 1981). Nonetheless, in order to limit side reactions, it is necessary to carry out the reactions at temperatures ranging from −60° C. to −80° C., which are difficult to reconcile with an industrial process.

Mention may also be made of processes requiring two steps: polymerization then post-modification. The post-polymerization modification can, for example, be a hydrophosphorylation (Advanced Synthesis & Catalysis (2008), 350, (3), pp 431-438), radical addition of $HS-(CH_2)_3-PO(OC_2H_5)_2$ (Polym. Bull., 1998, 41, pp 145-151), addition of ethyl phosphonate $HPO(OEt)_2$ to the carbon-carbon unsaturations of a polybutadiene (European Polymer Journal, Volume 19 Issue 12 pp 1159-65, 1983). Nonetheless, these processes have one or more drawbacks such as, for example, using expensive catalysts, exhibiting crosslinking side reactions or else only working on a certain type of polymers such as, for example, diene polymers that are rich in 1,2-functions.

SUMMARY

An aim of the present invention is to propose a novel process for synthesizing a polymer, especially an elastomer, bearing at least one phosphonate group in the polymer chain, especially at at least one end thereof, which process is simple and relatively inexpensive and which comprises a limited number of reaction steps and is not dependent on the structure of the polymer.

This goal is achieved by the use of a starting polymer bearing at least one nucleophilic function in the polymer chain and of an electrophilic compound bearing both a phosphonate group and an electrophilic function.

The synthesis process in accordance with the invention is a simpler process to carry out than the processes of the prior art. Advantageously, it is less expensive because it does not require the presence of catalyst. In addition, it does not rely on initiators or polymerization terminating agents, nor on protecting/deprotecting agents. It also makes it possible to obtain high polymer modification yields and to control the content of phosphonate groups introduced, especially at the chain end. Moreover, the process has the advantage of being industrializable.

I—DETAILED DESCRIPTION OF EXAMPLE EMBODIMENTS

In the present description, any interval of values denoted by the expression "between a and b" represents the range of values extending from more than "a" to less than "b" (that is to say, limits a and b excluded), whereas any interval of values denoted by the expression "from a to b" means the range of values extending from "a" up to "b" (that is to say, including the strict limits a and b).

"At least one group" or "at least one function" are intended to mean, respectively, one or more group(s) and one or more function(s).

A first subject of the present invention is a process for synthesizing a polymer bearing at least one phosphonate group in the polymer chain, said process comprising at least the reaction of a starting polymer bearing at least one nucleophilic function in the polymer chain with at least one electrophilic compound bearing both a phosphonate group and an electrophilic function, said electrophilic function being selected from the halide function, the acyl halide function, the ester function, the carboxylic acid function and the isocyanate function.

The invention also relates to a rubber composition based on at least one reinforcing filler and at least one polymer bearing at least one phosphonate group in the polymer chain and capable of being obtained according to the process defined above.

Another subject of the present invention relates to a semi-finished article comprising at least one crosslinkable or crosslinked rubber composition as defined above.

A subject of the invention also relates to a tire comprising at least one semi-finished article as defined above.

In the remainder of the disclosure of embodiments of the invention, the designation "starting polymer" denotes one or more macromolecule(s) bearing at least one nucleophilic function in the polymer chain and of use for the requirements of the synthesis process in accordance with embodiments of the invention.

The starting polymer bears at least one nucleophilic function in the polymer chain.

"Nucleophilic function" is intended to mean an electron-rich entity which has an affinity for any electron-depleted function. For example, a nucleophilic function is a negatively charged function or a function having a free electron pair. A nucleophilic function reacts by donating electrons to electrophilic compounds in order to form a covalent bond.

"Polymer chain" is intended to mean a linear chain of a macromolecule on which all the other long or short chains will be considered to be pendant, that is to say that the linear chain forms the backbone of the macromolecule, to which the pendant chains (long or short chains) are attached by a single point.

"Group Y in the polymer chain" is intended to mean that the group Y may be an end group Y or a pendant group Y. An end group Y is a group located at one end of a macromolecule, that is to say that it is only attached to a single monomer unit. A pendant group Y is a group which is located along the macromolecule chain. For example, a pendant group Y may be a substituent of a monomer unit.

"Function Y in the polymer chain" is intended to mean that the function Y may be an end function Y or a pendant function Y. An end function Y is a function located at one end of a macromolecule, that is to say that it is only attached to a single monomer unit. A pendant function is a function which is located along the macromolecule chain. For example, a pendant function Y may be a substituent of a monomer unit.

Thus, the starting polymer can bear, for example, one or more nucleophilic function(s) distributed along the polymer chain or else the starting polymer can bear a nucleophilic function at at least one end of the polymer chain.

The starting polymer can also bear one or more nucleophilic function(s) distributed along the polymer chain and a nucleophilic function at at least one end of the polymer chain.

According to any one of the embodiments of the invention, the starting polymer can be an elastomer, a liquid polymer or a thermoplastic polymer. Preferably, the starting polymer is an elastomer.

In the present application, "liquid polymer" is intended to mean a polymer which, at ambient temperature (23° C.), takes the shape of the container which contains it but the volume of which is predetermined.

According to any one of the embodiments of the invention, the starting polymer is a polymer obtained by polymerization of at least one olefinic monomer. The starting polymer may be a homopolymer of an olefinic monomer or a copolymer obtained by polymerization of at least one first olefinic monomer and at least one second olefinic monomer having a different structure from the first monomer.

"olefinic monomer" is intended to mean a monomer unit comprising at least one carbon-carbon double bond —C=C—. An olefinic monomer may comprise carbon and hydrogen atoms and optionally one or more heteroatoms.

The olefinic monomer according to embodiments of the invention may be of fossil origin or be bio-based. In the latter case, it may partially or completely result from biomass or be obtained from renewable starting materials resulting from biomass.

Mention may be made, as olefinic monomers, by way of nonexclusive examples, of:

ethylene,

α-olefin monomers, such as propylene, 1-butene, isobutylene, pentene, methylpentene, 1-hexene, etc., conjugated or non-conjugated diene monomers, fluorinated diene monomers, vinyl monomers such as vinylaromatics having from 8 to 20 carbon atoms, such as, for example, styrene, ortho-, meta- or para-methylstyrene, the vinylmesitylene commercial mixture, divinylbenzene, vinylnaphthalene and also vinylpyridines, vinyl(N—(C1-C6)alkyl)pyrroles, vinyloxazoles, vinylthiazoles, vinylpyrimidines, vinylimidazoles, etc., acrylic esters derived from acrylic acid or methacrylic acid with alcohols having 1 to 20 carbon atoms, preferably having from 1 to 12 carbon atoms, such as, for example, acrylic acid, acrylamide, methyl acrylate, ethyl acrylate, propyl acrylate, n-butyl acrylate, isobutyl acrylate, hexyl acrylate, 2-ethylhexyl acrylate, methacrylic acid, methacrylamide, methyl methacrylate, ethyl methacrylate, n-butyl methacrylate, isobutyl methacrylate, hexyl methacrylate or 2-ethylhexyl methacrylate, acrylic esters bearing an epoxy ring, such as glycidyl esters of an acrylic acid or of a methacrylic acid, especially glycidyl methacrylate, glycidyl acrylate or glycidyl itaconate, vinyl esters of carboxylic acids, vinyl nitriles, such as acrylonitrile and (meth)acrylonitrile, cyanoacrylates of esters of $C_1$-$C_6$ alcohol, vinyl ketones (vinyl methyl ketone, etc.), vinyl phenyl ketones, vinyl acetate, vinyl acetals, vinyl ethers (vinyl methyl ether, vinyl ethyl ether, vinyl isobutyl ether, etc.), vinyl alcohols, halogenated vinyl compounds (vinyl chloride, vinylidene chloride, tetrafluoroethylene, vinyl fluoride, vinylidene fluoride, ethylene/tetrafluoroethylene, perfluoroalkoxy, etc.), monomers comprising silicon, such as silanes, siloxanes (dimethylsiloxane, methylhydroxysiloxane, diphenylsiloxane, etc.), carbosilanes, etc., oxiranes such as ethylene oxide, propylene oxide, etc., cyclic esters such as lactones, lactides, etc., monomers comprising phosphorus (polyphosphazene), monomers comprising sulfur (thiazyl, sulfur nitride, etc.), monomers comprising boron (borazylenes), and the mixtures of these monomers.

The polymerization of such monomers is known per se. Those skilled in the art will know how to adjust the polymerization technique as a function of the type of monomer to be polymerized.

Preferentially, in the context of the invention, the olefinic monomers are selected from:
- ethylene,
- α-olefins, such as propylene, 1-butene, isobutylene, pentene, methylpentene, 1-hexene, etc.,
- conjugated or non-conjugated dienes,
- vinyl nitrites, such as acrylonitrile and (meth)acrylonitrile,
- acrylic esters derived from acrylic acid or from methacrylic acid with alcohols having from 1 to 20 carbon atoms, preferably having from 1 to 12 carbon atoms, such as, for example, acrylic acid, acrylamide, methyl acrylate, ethyl acrylate, propyl acrylate, n-butyl acrylate, isobutyl acrylate, hexyl acrylate, 2-ethylhexyl acrylate, methacrylic acid, methacrylamide, methyl methacrylate, ethyl methacrylate, n-butyl methacrylate, isobutyl methacrylate, hexyl methacrylate or 2-ethylhexyl methacrylate,
- acrylic esters bearing an epoxy ring, such as glycidyl esters of an acrylic acid or of a methacrylic acid, especially glycidyl methacrylate, glycidyl acrylate or glycidyl itaconate,
- vinyl monomers and vinylaromatic monomers, especially those having from 8 to 20 carbon atoms, such as, for example, styrene, ortho-, meta- or para-methylstyrene, the vinylmesitylene commercial mixture, divinylbenzene or vinylnaphthalene and also vinylpyridines, vinyl (N—(C1-C6)alkyl)pyrroles, vinyloxazoles, vinylthiazoles, vinylpyrimidines, vinylimidazoles, etc.),
- vinyl esters of carboxylic acids,
- vinyl alcohols,
- vinyl ethers,
- and the mixtures of these monomers.

The starting polymer can have any microstructure. The starting polymer can, for example, be a block, random, sequential or microsequential polymer and be prepared in dispersion, in emulsion or in solution; it can be star-branched, linear, telechelic or especially coupled.

According to any one of the embodiments of the invention, the starting polymer is preferentially an elastomer, more preferentially a diene elastomer.

Diene elastomer is intended to mean an elastomer which results at least in part (i.e. a homopolymer or a copolymer) from conjugated or non-conjugated diene monomers.

According to any one of the embodiments of the invention, the starting polymer is a homopolymer of a conjugated or non-conjugated diene monomer. Preferably, a conjugated diene monomer may be butadiene or isoprene.

According to any one of the embodiments of the invention, the starting polymer is a copolymer of at least one first conjugated or non-conjugated diene monomer and of at least one second monomer different from the first monomer and selected from ethylene, α-olefins, conjugated dienes, non-conjugated dienes, acrylic esters, acrylic esters bearing an epoxy ring, vinyl monomers, vinylaromatic monomers, vinyl nitriles, vinyl esters of carboxylic acids, vinyl alcohols and vinyl ethers.

According to any one of the embodiments of the invention, the starting polymer is a ternary copolymer obtained by copolymerization of a first acrylic ester monomer bearing an epoxy ring, of a second monomer selected from ethylene or an α-olefin, and a third monomer different from the second monomer and selected from ethylene, α-olefins, conjugated dienes, non-conjugated dienes, acrylic esters, acrylic esters bearing an epoxy ring, vinyl monomers, vinylaromatic monomers, vinyl nitriles, vinyl esters of carboxylic acids, vinyl alcohols and vinyl ethers.

Elastomer capable of being used in the invention is more particularly intended to mean:

(a) any homopolymer obtained by polymerization of a conjugated diene monomer having from 4 to 12 carbon atoms, such as for example 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, or 2,4-hexadiene;

(b) any homopolymer obtained by polymerization of a non-conjugated diene monomer having from 5 to 12 carbon atoms, such as, for example, 1,5-hexadiene or 1,4-pentadiene;

(c) any copolymer obtained by copolymerization of one or more of the conjugated dienes having from 4 to 12 carbon atoms, as defined above, with one another or with one or more monomers mentioned below:
- ethylene,
- vinylaromatic compounds having from 8 to 20 carbon atoms, such as, for example, styrene, ortho-, meta- or para-methylstyrene, the vinylmesitylene commercial mixture, divinylbenzene or vinylnaphthalene,
- vinyl nitrile monomers having from 3 to 12 carbon atoms, such as, for example, acrylonitrile or methacrylonitrile,
- vinyl alcohols;
- acrylic esters derived from acrylic acid or methacrylic acid with alcohols having 1 to 20 carbon atoms, preferably having from 1 to 12 carbon atoms, such as, for example, acrylic acid, acrylamide, methyl acrylate, ethyl acrylate, propyl acrylate, n-butyl acrylate, isobutyl acrylate, hexyl acrylate, 2-ethylhexyl acrylate, methacrylic acid, methacrylamide, methyl methacrylate, ethyl methacrylate, n-butyl methacrylate, isobutyl methacrylate, hexyl methacrylate or 2-ethylhexyl methacrylate, these copolymers can contain between 100% and 20% by weight of diene units and between 0% and 80% by weight of ethylenic, vinylaromatic, vinyl nitrile, vinyl alcohol and/or acrylic ester units;

(d) any copolymer obtained by copolymerization of one or more of the non-conjugated dienes having from 5 to 12 carbon atoms, as defined above, with one another or with one or more monomers mentioned below:
- ethylene,
- vinylaromatic compounds having from 8 to 20 carbon atoms, such as, for example, styrene, ortho-, meta- or para-methylstyrene, the vinylmesitylene commercial mixture, divinylbenzene or vinylnaphthalene,
- vinyl nitrile monomers having from 3 to 12 carbon atoms, such as, for example, acrylonitrile or methacrylonitrile,
- vinyl alcohols;
- acrylic esters derived from acrylic acid or methacrylic acid with alcohols having 1 to 20 carbon atoms, preferably having from 1 to 12 carbon atoms, such as, for example, acrylic acid, acrylamide, methyl acrylate, ethyl acrylate, propyl acrylate, n-butyl acrylate, isobutyl acrylate, hexyl acrylate, 2-ethylhexyl acrylate, methacrylic acid, methacrylamide, methyl methacrylate, ethyl methacrylate, n-butyl methacrylate, isobutyl methacrylate, hexyl methacrylate or 2-ethylhexyl methacrylate;

(e) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer, such as especially 1,4-hexadiene, vinylnorbornene, ethylidenenorbornene, norbornadiene or dicyclopentadiene; such polymers are described in particular in documents WO 2004/035639A1 and US 2005/0239639A1;

(f) a copolymer of isobutene and of isoprene (butyl rubber) and also the halogenated versions, in particular chlorinated or brominated versions, of this type of copolymer;

(g) a ternary copolymer obtained by copolymerization of a first monomer bearing an epoxy ring, such as acrylic esters bearing an epoxy ring, for example glycidyl esters of an acrylic or methacrylic acid, especially glycidyl methacrylate, glycidyl acrylate or glycidyl itaconate, of a second monomer selected from ethylene or an α-olefin, and of a third monomer, different from the second monomer, selected from ethylene, α-olefins, acrylonitrile, methacrylonitrile, acrylates, methacrylates, vinyl esters of carboxylic acids, vinyl alcohols, vinylaromatics or vinyl ethers;

(h) natural rubber;

(i) a mixture of several of the elastomers defined in (a) to (h) with one another.

According to a preferential embodiment of the invention, the starting polymer can be a diene elastomer selected from the group consisting of polybutadienes, polyisoprenes, butadiene copolymers, isoprene copolymers and mixtures thereof. Such copolymers are more preferentially selected from the group consisting of butadiene/styrene copolymers (SBRs), whether the latter are prepared by emulsion polymerization (ESBRs) or by solution polymerization (SSBRs), isoprene/butadiene copolymers (BIRs), ethylene/butadiene copolymers, isoprene/styrene copolymers (SIRs) and isoprene/butadiene/styrene copolymers (SBIRs), copolymers of butadiene and of (meth)acrylic acid ester, copolymers of isoprene and of (meth)acrylic acid ester, copolymers of butadiene, of styrene and of (meth)acrylic acid ester and copolymers of isoprene, of styrene and of (meth)acrylic acid ester. More preferably, the starting polymer is a polybutadiene.

The diene elastomers which can be used according to the invention can be obtained according to conventional polymerization techniques well known to those skilled in the art. The diene elastomers can have any microstructure, which depends on the polymerization conditions used, especially on the presence or absence of a modifying and/or randomizing agent and on the amounts of said agent employed. The diene elastomers may, for example, be block, random, sequential or microsequential elastomers and be prepared in dispersion, in emulsion or in solution. The diene elastomers may be linear, star-branched or telechelic, preferably linear.

The diene elastomers which can be used according to the invention can be coupled and/or star-branched in a way known per se, especially by means of a coupling and/or star-branching agent based on Si or Sn.

An essential characteristic of the starting polymer, especially of the diene elastomer, which can be used for the requirements of the synthesis process in accordance with embodiments of the invention is that it bears at least one nucleophilic function in the polymer chain. Mention may be made, as nucleophilic functions according to embodiments of the invention, of the hydroxyl function of primary, secondary or tertiary alcohol type, the primary or secondary amine function or else the thiol function; advantageously, the nucleophilic function is the hydroxyl function.

The synthesis of polymers bearing at least one nucleophilic function in the polymer chain is especially accessible in the literature relating to the functionalization of polymers. The functionalization can take place at any time in the synthesis of the starting polymer by various known means. Thus, the nucleophilic function can be introduced into the structure of the starting polymer at the time of the initiation of a radical or anionic polymerization, when the polymerization initiator bears this nucleophilic function. The function will be borne at the chain end on conclusion of the synthesis. The nucleophilic function can also be introduced at the chain end of a polymer by reacting a living polymer with a functionalization agent. The nucleophilic function can also be borne by one of the polymerized monomers. The nucleophilic function can also be introduced by post-polymerization chemical modification, for example by radical grafting.

According to an advantageous embodiment of the invention, the introduction of at least one end hydroxyl function into a polymer chain can be easily accessible in one synthesis step. There are two different principles for the synthesis of polymer bearing at least one end hydroxyl function: radical polymerization and anionic polymerization. The hydroxyl function can thus be introduced by a radical initiation in the presence of $H_2O_2$. Through the anionic polymerization in the presence of a mono- or polyfunctional polymerization initiator, the hydroxyl function can be obtained by termination of the polymerization in the presence of ethylene oxide or propylene oxide. "Polyfunctional polymerization initiator" is intended to mean a polymerization initiator which comprises several polymerization initiation sites. These initiators are well known to those skilled in the art and make it possible to obtain star-branched polymers.

According to another embodiment of the invention, the introduction of hydroxyl functions along the polymer chain can be obtained for example starting from polymers comprising at least one epoxy ring in their polymer chain after reaction with a hydride, or by polymerizing a monomer comprising alcohol functions, such as, for example, vinyl alcohol monomers.

Such polymers bearing at least one end hydroxyl function or hydroxyl function along the polymer chain and the processes for preparing same are well known to those skilled in the art. Some polymers are commercially available; this contributes to the advantage of the process according to embodiments of the invention as a result of the commercial availability of at least one of its reactants.

Mention may be made, as example of polymers which can be used for the requirements of the synthesis process in accordance with embodiments of the invention as starting polymers bearing at least one hydroxyl function, for example, of the Krasol commercial polybutadienes from Cray Valley, in particular Poly BD R45HTLO, Krasol LBH-P3000 and Krasol LBH 2000.

In the same way, the introduction of at least one end thiol function into a polymer chain can be easily accessible in one synthesis stage. The thiol function can be obtained by termination of the anionic polymerization in the presence of ethylene sulfide or propylene sulfide. Such polymers bearing at least one end thiol function and their preparation processes are well known to those skilled in the art.

According to any one of the embodiments of the invention, the starting polymer bears one or more nucleophilic functions in the polymer chain, more particularly one or more end nucleophilic functions. More particularly, the starting polymer is a linear polymer bearing, at at least one of its chain ends, a nucleophilic function, advantageously a hydroxyl function. More preferably still, the starting polymer is a linear polymer bearing, at each of its two ends of the polymer chain, a nucleophilic function, advantageously a hydroxyl function.

The molar content of nucleophilic function in the starting polymer which can be used for the requirements of the synthesis process in accordance with embodiments of the invention can vary to a great extent and is adjusted according to the properties desired for the final polymer in accordance with embodiments of the invention, especially depending on the use which will be made of it. It is expressed relative to 100 mol of monomer units constituting the starting polymer. The molar content of nucleophilic function in the starting polymer can be measured, for example, by NMR.

According to one embodiment, the content of end nucleophilic functions, preferably of hydroxyl functions, is at least 0.1 mol per 100 mol of monomer units constituting the starting polymer.

The other essential compound of the synthesis process of embodiments of the invention is an electrophilic compound. The electrophilic compound is a compound bearing both a phosphonate group and an electrophilic function.

"Electrophilic function" is intended to mean an entity having a site with an electron deficit and which has an affinity for any electron-rich function. For example, an electrophilic function may be a function having a δ+ polarity or a function having an electron vacancy. An electrophilic function reacts by accepting electrons from nucleophilic compounds in order to form a covalent bond.

The electrophilic function may be any electrophilic function. More particularly, it may be selected from the group consisting of the acyl halide function, the acyl chloride function, the carboxylic acid function, the ester function and the isocyanate function. More preferably, the electrophilic function is the carboxylic acid function.

The electrophilic function is capable of reacting with the nucleophilic function of the starting polymer by nucleophilic substitution, esterification, transesterification, etc.

"Acyl halide function" is intended to mean the —C(O)Hal group, the carbon atom being bonded to an $sp^3$ carbon atom and Hal being a halogen atom, preferably a chlorine atom.

"Carboxylic acid function" is intended to mean the —COOH group, the carbon atom being bonded to another $sp^3$ carbon atom.

"Ester function" is intended to mean the —COOR group, the carbon atom being bonded to an $sp^3$ carbon atom.

"Isocyanate function" is intended to mean the —CNO group, the carbon atom being bonded to an $sp^3$ carbon atom.

"Phosphonate group" is intended to mean a chemical group of generic structure —P(O)(ORa)(ORb) in which the phosphorus atom is bonded to an $sp^3$ carbon atom and in which Ra and Rb, which are identical or different, represent a hydrogen atom or a hydrocarbon-based chain. Through misuse of language, the term phosphonate also encompasses a phosphonic group, that is to say that Ra and Rb are identical and are a hydrogen atom. The term phosphonate also encompasses phosphonic hemiacids, that is to say groups in which at least Ra or Rb is a hydrogen atom.

According to one embodiment, the electrophilic compound bearing both a phosphonate group and an electrophilic function corresponds more particularly to the following formula (I):

A-B—X    (I)

in which:
A represents an electrophilic function selected from the halide function, the acyl halide function, the acyl chloride function, the carboxylic acid function, the ester function and the isocyanate function, preferably the carboxylic acid function,
B is a spacer representing a group of atoms forming a connection between A and X,
X represents a phosphonate group —P(O)(OR$_1$)(OR$_2$) with R$_1$ and R$_2$ being identical or different and selected from a hydrogen atom or a hydrocarbon-based chain having from 1 to 6 carbon atoms, preferably from 1 to 4 carbon atoms. Preferably, R$_1$ and R$_2$ are identical or different and are selected from a hydrogen atom, methyl, ethyl or propyl. Even more preferably, R$_1$ and R$_2$ are identical and represent a hydrogen atom.

The B group makes it possible to link together the A group and the X group. It may be a linear, branched or cyclic divalent hydrocarbon-based chain of 1 to 30 atoms, optionally interrupted by at least one heteroatom. Said chain can optionally be substituted. Said chain can also comprise at least one heteroatom, provided that it does not then constitute an electrophilic group which is reactive with regard to the nucleophilic function of the polymer. The heteroatom may be an atom of nitrogen, oxygen or sulfur.

Preferably, the B group is a (C$_1$-C$_{24}$)alkanediyl, preferably a (C$_5$-C$_{15}$)alkanediyl, preferably a (C$_8$-C$_{12}$)alkanediyl, even more preferably a decanediyl.

In the context of embodiments of the present invention, "(C$_1$-C$_{24}$)alkanediyl" is intended to mean a divalent group of general formula C$_n$H$_{2n}$ derived from an alkane having between 1 and 24 carbon atoms. The divalent group may be linear or branched and optionally substituted. As examples of (C$_1$-C$_{24}$)alkanediyls, mention may especially be made of a methylene group —CH$_2$—, an ethylene group —CH$_2$—CH$_2$—, a propylene group —CH$_2$—CH$_2$—CH$_2$—, a butylene group —CH$_2$—CH$_2$—CH$_2$—CH$_2$—, etc.

According to particularly advantageous embodiments of the invention, the electrophilic compound corresponds to the formula (II):

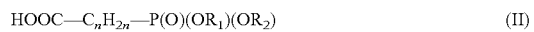

in which:
n is an integer and ranges from 5 to 15, preferably n=10,
R$_1$ and R$_2$, which are identical or different, represent a hydrogen atom or a hydrocarbon-based chain having from 1 to 6 carbon atoms, preferably from 1 to 4 carbon atoms. Preferably, R$_1$ and R$_2$ are identical or different and are selected from a hydrogen atom, methyl, ethyl or propyl. Even more preferably, R$_1$ and R$_2$ are identical and represent a hydrogen atom.

According to these particularly advantageous embodiments, the electrophilic compound more preferentially corresponds to the formula (III):

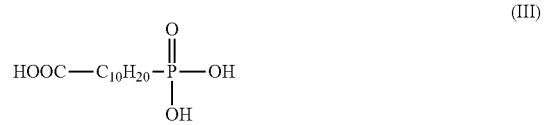

The electrophilic compounds used in the process in accordance with embodiments of the invention are commercially available from Specific Polymer, ABCR or Aldrich.

The reaction of the starting polymer with the electrophilic compound is generally carried out under conventional conditions for nucleophilic substitution reactions, esterification reactions, transesterification reactions, etc., in bulk or in solution.

According to variants of the invention, according to which the polymers obtained bear at least one phosphonate group in the polymer chain, on conclusion of the reaction between the starting polymer as defined above and the electrophilic compound as defined above, these phosphonate functions may advantageously be partially or totally converted by methods known to those skilled in the all into phosphonic acid functions (for example by reacting with TMSiBR/MeOH (trimethylsilylbromide/methanol)) or into phosphonic hemiacid functions example by reacting with sodium iodide (NaI)).

Those skilled in the art will understand that the scope of the process of the invention also extends to the combination of certain embodiments of the invention, and also certain preferential aspects, when appropriate and conceivable. Another subject of the process of the invention is these various combinations of characteristics.

Thus, according to a preferred embodiment of the process of the invention, at least one of the following conditions is met, more preferentially all:
the starting polymer is a linear polymer bearing a nucleophilic function at each of the two ends of the polymer chain,
the nucleophilic function is a hydroxyl function,
the polymer is a diene elastomer, preferably based on butadiene,
the electrophilic compound corresponds to the formula (I) in which A represents the carboxylic acid function,
the electrophilic compound corresponds to the formula (I) in which B represents a linear, branched or cyclic divalent hydrocarbon-based chain of 1 to 30 atoms, optionally interrupted by at least one heteroatom; B preferably represents a $(C_5-C_{15})$alkanediyl, more preferably a $(C_8-C_{12})$alkanediyl, even more preferably a decanediyl,
the electrophilic compound corresponds to the formula (I) in which X represents a phosphonic acid group.

The introduction according to embodiments of the invention of phosphonate groups by a post-polymerization reaction onto a starting polymer bearing at least one nucleophilic function in the polymer chain makes it possible to avoid the steps of protection and deprotection which are necessary when the anionic polymerization is terminated. In addition, the high yield, which can reach at least 90%, depending on the type of reaction between electrophilic and nucleophilic groups, enables perfect control of the content of functional group introduced within the polymer chain. Moreover, the process of embodiments of the invention does not require the use of expensive catalysts.

According to embodiments of the invention, the reaction of the starting polymer with the electrophilic compound results in the synthesis of a polymer which contains at least one phosphonate group in the polymer chain, preferably several phosphonate groups in the polymer chain. Advantageously, the reaction of the starting polymer with the electrophilic compound results in the synthesis of a polymer which contains at least one end phosphonate group, preferably two end phosphonate groups.

Another subject of the invention is a polymer bearing at least one phosphonate group, capable of being obtained by the process in accordance with the invention according to at least any one of its embodiments described above. The polymer in accordance with embodiments of the invention can be an elastomer, a liquid polymer or a thermoplastic polymer. Preferably, the polymer in accordance the invention is an elastomer, more preferentially a diene elastomer.

The polymer in accordance with embodiments of the invention comprises, on the one hand, a main chain derived from a polymer bearing the nucleophilic function in the polymer chain and, on the other hand, at least one group in the chain bearing the phosphonate group, which phosphonate group is connected to the main chain via a divalent group resulting from the reaction of the nucleophilic function with the electrophilic function of the electrophilic compound.

According to any one of the embodiments of the invention, the content of phosphonate group in the polymer is at least 0.1 mol and at most 100 mol per 100 mol of monomer units constituting the polymer in accordance with embodiments of the invention, preferentially at most 80 mol; even more preferentially, this content varies from 0.1 to 50 mol, more particularly from 0.1 to 20 mol per 100 mol of monomer units constituting the polymer in accordance with embodiments of the invention.

According to any one of the embodiments of the invention, the main chain of the polymer in accordance with the invention preferably contains monomer units selected from the group consisting of ethylene units, α-olefin units, conjugated or non-conjugated diene units, (meth)acrylonitrile units, (meth)acrylate units, vinyl ester of carboxylic acid units, vinyl alcohol units and vinyl ether units, as described above. Mention may be made, as α-olefin units, of vinylaromatic compounds, such as styrene, and mention may be made, as dienes, of conjugated dimes, such as 1,3-butadiene and isoprene, and non-conjugated dienes.

According to any one of the embodiments of the invention, the polymer in accordance with the invention corresponds for example to the formula (IV):

$$((X\text{-}D)_j\text{-}Pol)_i\text{-}Y \qquad (IV)$$

in which:
Pol represents a polymer chain derived from the starting polymer,
Y is a mono- or polyvalent radical or a covalent bond,
i is an integer between 1 and 12, preferably between 1 and 4,
j, representing the number of phosphonate groups within the polymer chain Pol (that is to say, at the end of the chain Pol and/or distributed along the chain Pol), is an integer greater than or equal to 1,
D is a divalent atom or group of divalent atoms making it possible to covalently connect the X function to the remainder of the polymer chain Pol and resulting from the reaction of the nucleophilic function of the starting polymer with the electrophilic function A of the electrophilic compound,
X is the phosphonate group as described above.

Pol represents the polymer chain derived from the starting polymer. The latter is as described above, encompassing all its variants.

Those skilled in the art will understand that the main chain of the polymer in accordance with embodiments of the invention can comprise residual nucleophilic functions. The content of these residual nucleophilic functions depends especially on the stoichiometry of the reagents, in particular on the amount of electrophilic compound introduced into the reaction medium relative to the molar content of nucleophilic function present on the starting polymer. The values of i and j depend on the yield of the grafting reaction, on the molar content of nucleophilic functions in the starting polymer, and also on the amount of electrophilic compound and the nature of the polymerization initiator. (i×j) is a number at least equal to 1; it is preferably strictly greater than 1. According to a particularly preferred embodiment, (i×j) is equal to 2.

D can be the divalent group resulting from the reaction of the end nucleophilic function with an electrophilic function selected, for example, from the group consisting of the acyl halide function, the carboxylic acid function, the ester function and the isocyanate function, preferably the carboxylic acid function. Those skilled in the art will understand that D also comprises the "spacer" B of the electrophilic compound.

According to an advantageous embodiment of the invention, D can be the divalent group resulting from the reaction of the end hydroxyl function with a carboxylic acid electrophilic function and incorporating the "spacer" B.

According to an advantageous embodiment, X is a phosphonic acid.

According to certain variants of the invention, Y is a mono- or polyvalent radical resulting from the nature of the respectively mono- or polyfunctional anionic polymerization initiator. According to other variants of the invention, Y is a mono- or polyvalent radical resulting from a post-polymerization modification of the polymer, especially by coupling or star-branching.

According to an advantageous embodiment of the invention, the polymer in accordance with the invention corresponds to the formula (V):

X-D-Pol-D-X     (V)

in which Pol, X and D are as defined above.

More particularly still, according to this embodiment, at least one of the following conditions is met, preferably all:
Pol is a polybutadiene,
X is a phosphonic acid,
D is a divalent group derived from a carboxylate of formula —B—C(O)O—; B represents a $(C_5-C_{15})$alkanediyl group, preferably a $(C_8-C_{12})$alkanediyl group, preferably a decanediyl.

The polymers bearing one or more phosphonate groups in the polymer chain according to embodiments of the invention can be used as is or as mixtures with one or more other compounds. The presence of phosphonate groups makes it possible to envisage a use in applications similar to those of modified polymers in general, and polymers bearing phosphonate groups in particular. For example, it is known, in order to optimize the interactions between a diene elastomer and a reinforcing filler within a rubber composition, to modify the nature of the diene elastomers in order to introduce functional groups therein. Thus, the specific structure of the polymer bearing one or more phosphonate group(s) according to embodiments of the invention makes it possible to envisage its use in the manufacture of various products based on reinforced rubber when the polymer is a diene elastomer, especially with a view to improving the dispersion of the filler within the elastomer matrix.

Another subject of the invention is thus a rubber composition based on at least one reinforcing filler and at least one polymer in accordance with embodiments of the invention, especially which is preferentially an elastomer, more preferentially a diene elastomer.

The term "rubber composition based on" should be understood as meaning a rubber composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

The diene elastomer bearing one or more phosphonate group(s) in the polymer chain in accordance with embodiments of the invention may then more particularly be selected from polybutadiones, polyisoprenes, butadiene copolymers, isoprene copolymers and their mixtures. Suitable as diene elastomer are, for example, SBRs, BIRs, SIRs, SBIRs, ethylene/butadiene copolymers, copolymers of butadiene and of (meth)acrylic acid ester, copolymers of isoprene and of (meth)acrylic acid ester, copolymers of butadiene, of styrene and of (meth)acrylic acid ester or copolymers of isoprene, of styrene and of (meth)acrylic acid ester. More preferably, the diene elastomer bearing one or more phosphonate group(s) in the polymer chain in accordance with embodiments of the invention is a polybutadiene.

The rubber composition in accordance with embodiments of the invention has the characteristic of comprising at least one reinforcing filler, for example carbon black, a reinforcing filler other than carbon black, especially of siliceous type, such as silica, with which is combined, in a known way, a coupling agent, or else a mixture of these two types of filler.

According to variants of the invention, the composition can, besides the polymer in accordance with embodiments of the invention, comprise at least one second diene elastomer.

More particularly suitable as second diene elastomer are natural rubber, polybutadienes (BRs), butadiene copolymers, polyisoprenes (IRs), ethylene/butadiene copolymers, isoprene copolymers and the mixtures of these elastomers. Such copolymers are more preferentially selected from the group consisting of copolymers of butadiene and of a vinylaromatic monomer, more particularly the butadiene/styrene copolymer (SBR), isoprene/butadiene copolymers (BIRs), copolymers of isoprene and of a vinylaromatic monomer, more particularly the isoprene/styrene copolymer (SIR), and isoprene/butadiene/styrene copolymers (SBIRs).

The second diene elastomer may be star-branched, coupled, functionalized or non-functionalized, in a way known per se, by means of functionalization agents, coupling agents or star-branching agents known to those skilled in the art.

The rubber compositions in accordance with embodiments of the invention can also comprise all or a portion of the normal additives generally used in elastomer compositions intended for the manufacture of tires, such as, for example, pigments, protective agents, anti-fatigue agents, plasticizers, reinforcing resins, methylene donors (for example HMT or H3M), a crosslinking system and the mixtures of such compounds.

The manufacture of the rubber compositions in accordance with embodiments of the invention is well known to those skilled in the art. The compounds mentioned above and participating in the preparation of rubber compositions can be of fossil or bio-based origin. In the latter case, they may partially or completely result from biomass or be obtained from renewable starting materials resulting from biomass. This relates especially to polymers, plasticizers, fillers, etc.

The use of such a rubber composition is particularly appropriate in the field of tires, especially for vehicles. It is for this reason that a semi-finished article, such as a tread or a sidewall, and a tire, at least one of the constituent elements of which comprises at least one rubber composition based on at least one diene elastomer bearing one or more phosphonate group(s) in the polymer chain in accordance with embodiments of the invention, also constitute subjects of the invention.

The abovementioned characteristics of the present invention, and also others, will be better understood on reading the following description of several exemplary embodiments of the invention, given by way of illustration and without limitation.

molar masses are relative to a calibration curve produced from commercial polystyrene standards.

II.2—Preparation of Polymers Bearing End Phosphonic Acid Groups:

Example 1: Esterification of Krasol LBH-P 3000 by 10-Carboxyldecyl Phosphonic Acid

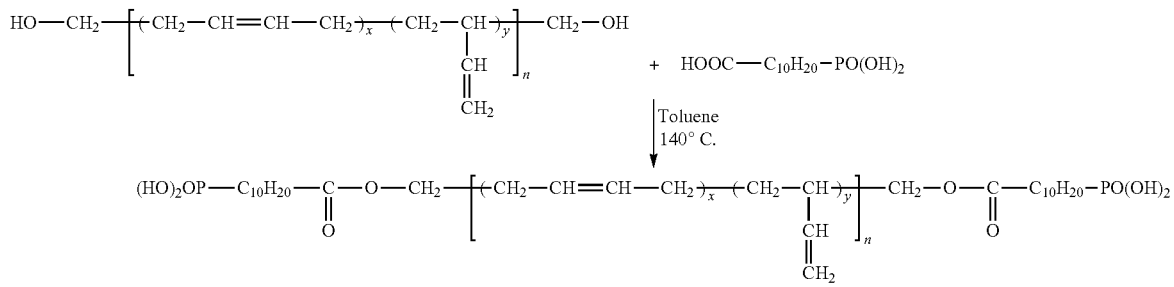

II—EXEMPLARY EMBODIMENTS OF THE INVENTION

II.1—Measurements Used:
II.1.1—Nuclear Magnetic Resonance (NMR):

The contents of the different monomer units and their microstructures and the contents of functions borne within the copolymer are determined by an NMR analysis. The $^1$H NMR analyses are carried out with a Bruker Avance 300 (300 MHz) spectrometer, QNP $^1$H, $^{31}$P, $^{19}$F and $^{13}$C probe. The samples are dissolved in deuterated chloroform (CDCl$_3$).

II.1.2—Size Exclusion Chromatography (SEC):

Size exclusion chromatography (SEC) is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polymoleculartity or polydispersity index (PI=Mw/Mn) can be calculated via a "Moore" calibration.

Preparation of the polymer: there is no specific treatment of the polymer sample before analysis. The latter is simply dissolved, in tetrahydrofuran, at a concentration of approximately 1 g/l. The solution is then filtered through a filter with a porosity of 0.45 μm before injection.

SEC analysis: the SEC analyses are carried out on a Varian PL-GPC 50 with RI detector and PolyPore column system. Flow rate: 1 ml/min; elution solvent: THF; temperature of the system: 35° C. The calculated number-average 25.0 g of Krasol LBH-P 3000, 4.4 g (2.1 eq) of 10-carboxyldecyl phosphonic acid sold by Specific Polymers and 300 ml of toluene are introduced into a single-necked round-bottomed flask. The round-bottomed flask is equipped with a Dean and Stark apparatus and then the mixture is placed under stirring at 140° C. for 48 hours. The esterification reaction is autocatalysed by the phosphonic acid.

At the end of the reaction, the telechelic polybutadiene is coagulated in 2 l of methanol. The solvent residues are eliminated by placing in an oven at 60° C. for 4 h.

The final product is a translucent viscous liquid obtained with a yield of 80%.

The $^1$H NMR spectrum makes it possible to confirm the structure of the functionalized polybutadiene by integration of signals characteristic of the protons 1 to 6 which appear in the form of broad unresolved peaks:

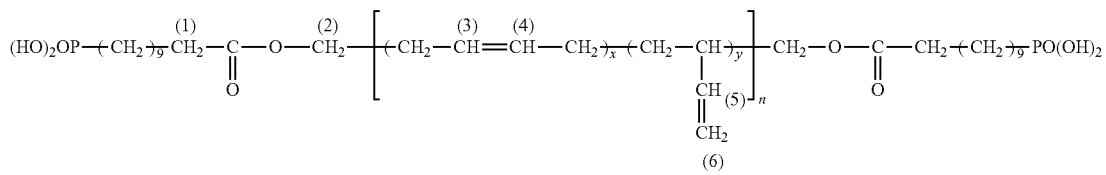

| Proton No. | Chemical shift (ppm) | Number of protons |
|---|---|---|
| H1 | 2.2-2.3 | 2 |
| H2 | 3.9-4.1 | 2 |
| H6 | 4.8-5.1 | 2 |
| H3 H4 H5 | 5.2-5.8 | 3 |

The $^{31}$P NMR spectrum in the CDCl$_3$ causes a broad signal to appear at 38.2 ppm, corresponding to the grafted phosphonic acids.

The molar composition of the polybutadiene is as follows: 35 mol % of 1,4-double bond and 65 mol % of 1,2-double bond. The number-average molar mass of the polybutadiene is 3730 g/mol. The "phosphonic acid" function index is 0.52 meq/g; there are approximately 1.95 functions per chain.

Example 2: Esterification of PolyBd R45-HTLO by 10-Carboxyldecyl Phosphonic Acid

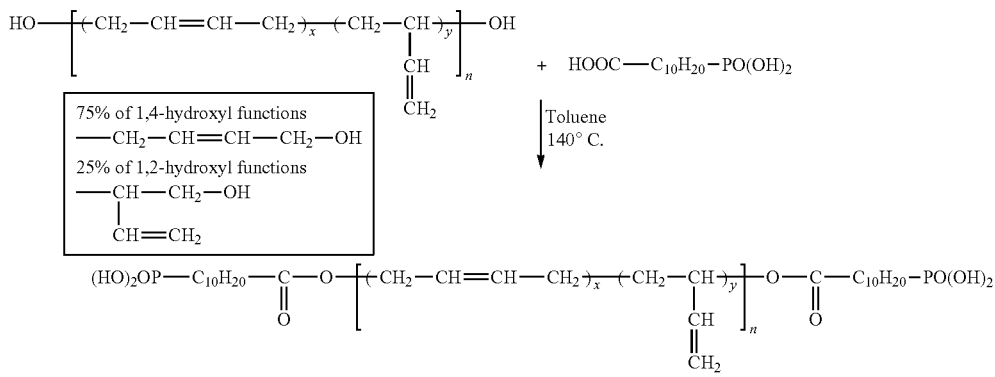

25.0 g of PolyBd R45-HTLO, 6.3 g (2.1 eq) of 10-carboxyldecyl phosphonic acid sold by Specific Polymers and 300 ml of toluene are introduced into a single-necked round-bottomed flask. The round-bottomed flask is equipped with a Dean and Stark apparatus and then the mixture is placed under stirring at 140° C. for 48 h. The esterification reaction is autocatalysed by the phosphonic acid.

At the end of the reaction, the telechelic polybutadiene is coagulated in 2 l of methanol. The solvent residues are eliminated by placing in an oven at 60° C. for 4 h.

The final product is a translucent yellow viscous liquid obtained with a yield of 75%.

The $^1$H NMR spectrum makes it possible to confirm the structure of the functionalized polybutadiene by integration of signals characteristic of the protons 1 to 6 which appear in the form of broad unresolved peaks:

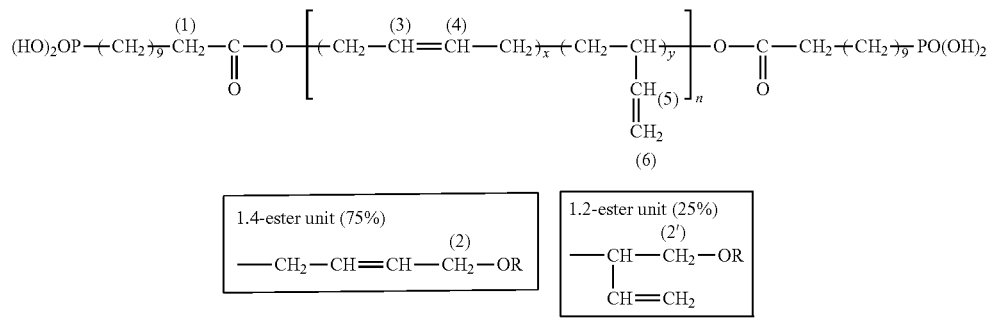

| Proton No. | Chemical shift (ppm) | Number of protons |
| --- | --- | --- |
| H1 | 2.2-2.3 | 2 |
| H2' | 3.9-4.1 | 2 |
| H2 | 4.4-4.7 | 2 |
| H6 | 4.9-5.2 | 2 |
| H3 H4 H5 | 5.3-5.9 | 3 |

The $^{31}$P NMR spectrum in the CDCl$_3$ causes a broad signal to appear at 38.1 ppm, corresponding to the grafted phosphonic acids.

The molar composition of the polybutadiene is as follows: 60% mol of 1,4-trans-double bond, 20% mol of 1,4-cis-double bond and 20% mol of 1,2-double bond. The number-average molar mass of the polybutadiene is 3420 g/mol. The "phosphonic acid" function index is 0.44 meq/g; there are approximately 1.5 functions per chain.

The invention claimed is:

1. A process for synthesizing a polymer bearing at least one phosphonate group in the polymer chain, said process comprising at least the reaction of a starting linear polymer bearing a nucleophilic function at each of its two chain ends with at least one electrophilic compound bearing both a phosphonate group and an electrophilic function, said electrophilic function being selected from the halide function, the acyl halide function, the ester function, the carboxylic acid function and the isocyanate function.

2. A process according to claim 1, wherein the electrophilic compound bearing both a phosphonate group and an electrophilic function has the general formula (I)

$$A\text{-}B\text{---}X \qquad (I)$$

in which:
A represents an electrophilic function selected from the halide function, the acyl halide function, the acyl chloride function, the carboxylic acid function, the ester function and the isocyanate function,
B is a spacer representing a group of atoms forming a connection between A and X,
X represents a phosphonate group —P(O)(OR$_1$)(OR$_2$) with R$_1$ and R$_2$ being identical or different and selected from a hydrogen atom or a hydrocarbon-based chain having from 1 to 6 carbon atoms.

3. A process according to claim 2, wherein the spacer B is a group of atoms; the spacer B is a linear, branched or cyclic divalent hydrocarbon-based chain of 1 to 30 atoms, optionally interrupted by at least one heteroatom.

4. A process according to claim 3, wherein the spacer B is a (C$_1$-C$_{24}$)alkanediyl.

5. A process according to claim 1, wherein the electrophilic function A is the carboxylic acid function.

6. A process according to claim 5, wherein the electrophilic compound bearing both a phosphonate group and an electrophilic function corresponds to the formula (II):

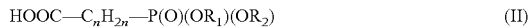

$$HOOC—C_nH_{2n}—P(O)(OR_1)(OR_2) \quad (II)$$

in which:
n is an integer and ranges from 5 to 15;
$R_1$ and $R_2$, which are identical or different, represent a hydrogen atom, a hydrocarbon-based chain having from 1 to 6 carbon atoms.

7. A process according to claim 6, wherein the electrophilic compound corresponds to the formula (III):

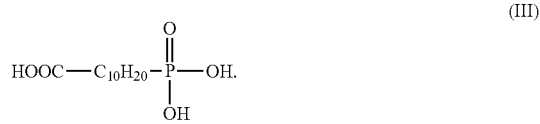

$$HOOC—C_{10}H_{20}—\underset{\underset{OH}{|}}{\overset{\overset{O}{\|}}{P}}—OH. \quad (III)$$

8. A process according to claim 1, wherein the nucleophilic function of the starting linear polymer is selected from the hydroxyl function —OH, the amine function —$NH_2$, the thiol function —SH.

9. A process for synthesizing a polymer bearing at least one phosphonate group in the polymer chain, said process comprising at least the reaction of a starting polymer bearing at least one nucleophilic function in the polymer chain with at least one electrophilic compound bearing both a phosphonate group and an electrophilic function, said electrophilic function being selected from the halide function, the acyl halide function, the ester function, the carboxylic acid function and the isocyanate function, wherein the starting polymer is a polymer resulting from the polymerization of at least one monomer selected from ethylene, α-olefins, conjugated dienes, non-conjugated dienes, acrylic esters, acrylic esters bearing an epoxy ring, vinyl monomers, vinylaromatic monomers, vinyl nitriles, vinyl esters of carboxylic acids, vinyl alcohols, vinyl ethers and mixtures of these monomers.

10. A process according to claim 9, wherein the starting polymer is an elastomer.

11. A process according to claim 10, wherein the starting polymer is a homopolymer of a conjugated or non-conjugated diene monomer.

12. A process according to claim 10, wherein the starting polymer is a copolymer of at least one first conjugated or non-conjugated diene monomer and of at least one second monomer different from the first monomer and selected from ethylene, α-olefins, conjugated dienes, non-conjugated dienes, acrylic esters, acrylic esters bearing an epoxy ring, vinyl monomers, vinylaromatic monomers, vinyl nitriles, vinyl esters of carboxylic acids, vinyl alcohols and vinyl ethers.

13. A process according to claim 10, wherein the starting polymer is a ternary copolymer obtained by copolymerization of a first acrylic ester monomer bearing an epoxy ring, of a second monomer selected from ethylene or an α-olefin, and of a third monomer different from the second monomer and selected from ethylene, α-olefins, conjugated dienes, non-conjugated dienes, acrylic esters, acrylic esters bearing an epoxy ring, vinyl monomers, vinylaromatic monomers, vinyl nitriles, vinyl esters of carboxylic acids, vinyl alcohols and vinyl ethers.

14. A process according to claim 11, wherein the conjugated diene monomer is butadiene or isoprene.

15. A process according to claim 11, wherein the starting polymer is polybutadiene.

16. A polymer bearing at least one phosphonate group in its polymer chain, capable of being obtained by a process comprising at least the reaction of a starting polymer bearing at least one nucleophilic function in the polymer chain with at least one electrophilic compound bearing both a phosphonate group and an electrophilic function, said electrophilic function being selected from the halide function, the acyl halide function, the ester function, the carboxylic acid function and the isocyanate function, and wherein the polymer is selected from polybutadienes, polyisoprenes, butadiene copolymers, isoprene copolymers and mixtures thereof.

17. A rubber composition based on at least one reinforcing filler and on at least one polymer bearing at least one phosphonate group in its polymer chain, capable of being obtained by a process comprising at least the reaction of a starting polymer bearing at least one nucleophilic function in the polymer chain with at least one electrophilic compound bearing both a phosphonate group and an electrophilic function, said electrophilic function being selected from the halide function, the acyl halide function, the ester function, the carboxylic acid function and the isocyanate function.

18. A semi-finished article made of rubber for a tire, wherein the article comprises at least one crosslinkable or crosslinked rubber composition defined according to claim 17.

19. A tire comprising at least one semi-finished article defined according to claim 18.

* * * * *